(12) United States Patent
Williamson et al.

(10) Patent No.: US 9,388,804 B2
(45) Date of Patent: Jul. 12, 2016

(54) OIL PUMP WITH SELECTABLE OUTLET PRESSURE

(75) Inventors: Matthew Williamson, Richmond Hill, CA (US); Ken T. Takamatsu-Unuvar, Kanagawa (JP); Darrell F. Greene, Bradford, CA (US)

(73) Assignee: Magna Powertrain Inc., Concord (CA)

( * ) Notice: Subject to any disclaimer, the term of this patent is extended or adjusted under 35 U.S.C. 154(b) by 340 days.

(21) Appl. No.: 13/981,467

(22) PCT Filed: Jan. 27, 2012

(86) PCT No.: PCT/CA2012/000146
§ 371 (c)(1),
(2), (4) Date: Sep. 12, 2013

(87) PCT Pub. No.: WO2012/100344
PCT Pub. Date: Aug. 2, 2012

(65) Prior Publication Data
US 2013/0343937 A1     Dec. 26, 2013

Related U.S. Application Data

(60) Provisional application No. 61/437,365, filed on Jan. 28, 2011.

(51) Int. Cl.
*F01M 1/16* (2006.01)
*F04B 49/22* (2006.01)
(Continued)

(52) U.S. Cl.
CPC ............... *F04B 49/22* (2013.01); *F01M 1/16* (2013.01); *F04B 53/18* (2013.01); *F16N 23/00* (2013.01)

(58) Field of Classification Search
CPC ........ F04B 49/08; F04B 49/22; F04B 49/225; F04B 53/18; F04B 39/02; F04B 39/0207; F16K 17/0446; F16K 17/046; F16K 17/0473; F16K 17/04; F01M 1/16; F01M 1/02; G05D 16/2093; G05D 16/2026; Y10T 137/2544; F16N 13/02; F16N 13/04; F16N 13/10; F16N 13/16; F16N 13/18; F16N 7/38; F16N 7/385; F16N 7/40; F01D 25/20; F16H 57/0434

USPC .......... 417/281, 307; 137/487.5, 596.16, 485, 137/489, 489.5; 251/30.01, 30.02; 123/196 R
See application file for complete search history.

(56) References Cited

U.S. PATENT DOCUMENTS 3,520,322 A * 7/1970 Kaptur .................... F15B 11/02
                                                    137/116.3
4,468,173 A * 8/1984 Dantlgraber ............ F04B 49/08
                                                        417/220
(Continued)

FOREIGN PATENT DOCUMENTS

JP     H06 10635 A     1/1994
JP     H09 88533 A     3/1997
(Continued)

OTHER PUBLICATIONS

European Patent Office; Supplementary European Search Report; Jan. 20, 2014.

(Continued)

*Primary Examiner* — Devon Kramer
*Assistant Examiner* — Nathan Zollinger
(74) *Attorney, Agent, or Firm* — Warn Partners, P.C.

(57) ABSTRACT

An oil pressure relief valve for use in the oil pump lubrication system of an internal combustion engine is controlled by both oil pump outlet pressure and by pilot pressure from a pilot valve which is selectively applied by a control member, preferably a two-way valve that is operated by the engine control module. The pilot valve selectively supplies one of the oil pump outlet pressure or the engine gallery pressure to the control member which selectively supplies pilot valve pressure to the oil pump pressure relief valve which has a single piston. The pilot valve includes first and second pistons for selectively controlling back pressure from the pressure relief valve and for managing changes in oil pressure due to changes in the engine gallery to maintain a virtually constant pressure even as oil pump speed increases when the control member connects the pilot valve to the pressure relief valve resulting in a fuel economy benefit and improved control of the oil pump pressure.

6 Claims, 11 Drawing Sheets

(51) Int. Cl.
*F04B 53/18* (2006.01)
*F16N 23/00* (2006.01)

(56) References Cited

U.S. PATENT DOCUMENTS

| | | | |
|---|---|---|---|
| 4,657,041 A * | 4/1987 | Mitsui | G05D 16/2093 137/116.3 |
| 6,082,321 A | 7/2000 | Kopec | |
| 6,116,272 A | 9/2000 | Kratzet | |
| 7,775,503 B2 | 8/2010 | Zhou | |
| 8,186,327 B2 * | 5/2012 | Ni | F01M 1/16 123/196 CP |
| 8,202,061 B2 * | 6/2012 | Shulver | F01M 1/16 417/212 |
| 2002/0172604 A1 | 11/2002 | Berger | |
| 2007/0231161 A1 | 10/2007 | Williamson | |
| 2010/0028717 A1 | 2/2010 | Ishikawa et al. | |
| 2012/0055442 A1 * | 3/2012 | Morinaka | F04C 14/26 123/196 R |
| 2014/0072458 A1 * | 3/2014 | Watanabe | F02M 39/02 417/290 |
| 2015/0107686 A1 * | 4/2015 | Watanabe | F01M 1/16 137/102 |

FOREIGN PATENT DOCUMENTS

| | | |
|---|---|---|
| JP | 2008-309016 A | 12/2008 |
| JP | 2008309016 A * | 12/2008 |
| WO | 2008/037070 A1 | 4/2008 |
| WO | WO 2008037070 A1 * | 4/2008 |
| WO | 2010/143265 A1 | 12/2010 |

OTHER PUBLICATIONS

International Search Report for International Patent Application No. PCT/CA2012/000146 Filed Jan. 27, 2012.

* cited by examiner

OIL PUMP WITH SELECTABLE OUTLET PRESSURE

CROSS REFERENCE TO RELATED APPLICATION

This application is a National Stage of International Application No. PCT/CA2012/000146, filed Jan. 27, 2012. This application claims priority to and the benefit of U.S. Provisional Patent Application Ser. No. 61/437,365, filed 28 Jan. 2011, in the name of Williamson et al, entitled OIL PUMP WITH SELECTABLE OUTLET PRESSURE, the entire disclosures of the above applications are incorporated herein by reference for all purposes.

FIELD

This present disclosure relates generally to an oil pump assembly including a pressure relief valve for managing the oil pump discharge pressure and the control valve pilot pressure. More particularly, the present disclosure relates to a pressure relief valve having a pilot valve in communication therewith having particular application in a fixed displacement pump lubrication system in an internal combustion engine.

BACKGROUND

It is generally known to provide an internal combustion engine including an oil pump assembly for pumping engine oil through the engine to lubricate the engine components through various lubrication channels (also generally known as passageways and collectively referred to as the engine gallery). It is also known to provide the oil pump assembly with a device to regulate the oil pump pressure. It is generally known to regulate the discharge pressure during engine operation to satisfy the engine's oil pressure limits and to attempt to provide energy management to the oil pump.

Pumps for incompressible fluids, such as oil, are often either gear pumps or vane pumps. In environments such as automotive engine lubrication systems, these pumps will operate over a wide range of speeds, as the engine operating speed changes, resulting in the output volume and the output pressure, as the output of these pumps is generally supplied to a lubrication system which can be modeled as a fixed size orifice, of the pumps changing with their operating speed. Generally, an engine requires the lubrication oil pressure to increase from a minimum necessary pressure level to a maximum necessary pressure level as the engine operating speed increases, but the maximum necessary oil pressure is generally obtained from the pumps well before the engine reaches its maximum operating speed. Thus, the pumps will provide an oversupply of lubrication oil over a significant portion of the engine operating speed range. Known systems employ an oil pump, driven by the engine, for ensuring sufficient circulation of oil through the engine. While a deprivation of oil can result in damage to engine components, over-pressurized oil is also undesirable. For example, too high an oil pressure can destroy paper filter elements.

To prevent over-pressurized oil, it is generally known for the lubrication system to include a pressure relief valve. To control this oversupply, and the resulting over pressure which could otherwise damage engine components, constant displacement pumps in such environments are typically provided with a pressure relief valve which allows the undesired portion of the oversupplied oil to return to an oil sump or tank or back to the inlet port of the pump so that only the desired volume, and hence pressure, of fluid is supplied to the engine. The pressure relief valve is connected with the oil pump and engine to vent oil back into the oil sump (i.e., to the oil pump's suction side) when the oil pressure reaches a preset limit. One known type of pressure relief valve is disclosed in U.S. Pat. No. 6,116,272, wherein the pressure relief valve is integrated into the oil pump. The pressure relief valve includes a piston positioned within a cylindrical bore and the piston is biased in one direction by a spring. Pressurized oil from the oil pump outlet is supplied to the side of the piston opposite the spring and forces the piston against the spring. As the engine rotates faster, the oil pump also rotates faster and works harder and the oil pressure increases. As the oil pressure increases, the piston in the oil pressure relief valve moves against the spring and within the bore to a point where vents on the edges of the piston allow oil to escape back to the sump or pump. With this type of conventional oil pressure relief valve, the oil pump outlet pressure is used to determine when the oil pressure relief valve will open to internally by-pass the high pressure oil from the discharge side of the oil pump back to the suction side of the oil pump. A typical oil pressure relief valve of this type would be set to open at a preset pressure level appropriate for the particular engine and application.

Although such a conventional oil pressure relief valve is simple and reliable, the oil pump's power consumption is relatively high as it works to increase the oil pressure to the preset pressure level even though a lower oil pressure may be adequate to provide satisfactory lubrication of the engine components. A high power consumption by the oil pump equates to reduced fuel efficiency, which is a disadvantage. In one known application, an oil pressure relief valve for use in the lubrication system of an engine is controlled by both pump outlet pressure and by a pilot pressure applied to the opposite side of the piston in the pressure relief valve. The action of the pilot valve reduces the startup pressure spikes associated with known pilot-operated valves, while also permitting a fuel economy benefit. There long remains a need to continue to improve the fuel efficiency of the engine and its associated components and the vehicle. Several examples of these known systems include the systems disclosed in U.S. Patent Application publication numbers 2007/0231161 and 2010/0028171 and U.S. Pat. No. 7,775,503, the disclosures of which are incorporated herein.

SUMMARY

In one exemplary embodiment there is disclosed a pressure relief valve system for use in a fluid lubrication system, such as in an internal combustion engine having an oil pump for circulating the fluid (oil) throughout the lubrication system. The pressure relief valve system includes a pressure relief valve including a housing having a bore having a single piston therein and a pressure relief spring for biasing the piston in a first direction in the bore. The pressure relief valve further includes an inlet port for admitting a fluid from a high pressure side of the fluid lubrication system into the bore to one side (e.g., high pressure) of the piston to move the piston against (i.e., opposite) the force of the pressure relief spring, and an outlet port for expelling the fluid from the bore once the piston has been moved against the increasing spring force to put the inlet port in communication with the outlet port. The pressure relief valve further includes, in one embodiment, a pilot valve pressure inlet port for admitting fluid into the bore of the pressure relief valve and applying the pilot valve pressure to the piston in a direction opposite the fluid pressure from the inlet port.

In one exemplary embodiment the pressure relief valve system further includes a pilot valve having a pilot housing having a pilot bore having a pilot piston and a pilot spring received therein for biasing the pilot piston in a first direction within the pilot bore. The pilot valve further includes a pilot inlet port for admitting a fluid from a high pressure side of the fluid lubrication system into the pilot bore to one side of the pilot piston to move the pilot piston against the force of the pilot spring; a first pilot outlet port for expelling the fluid from the high pressure side of the fluid lubrication system from the pilot valve and a second outlet port for expelling the fluid from the high pressure side of the fluid lubrication system from the pilot valve.

The pilot valve further includes second pilot piston movable within the first pilot piston and also biased by the pilot spring in the first direction. The first pilot piston includes a passage for admitting the fluid from the high pressure side of the fluid lubrication system to the second pilot piston such that the first and second pilot pistons will move against the force of the pilot spring. The pressure relief valve system further includes, in one embodiment, a control member having an inlet and first and second outlets wherein the inlet receives fluid from the first outlet port of the pilot valve, the first outlet of the control member expels the fluid from the pressure relief valve system to a reservoir and the second outlet of the control member supplies the fluid to the pilot inlet port in the pressure relief valve. In one embodiment, the control member is selectively operated by a signal for switching the inlet port of the control member to communicate with one of the first and second outlet ports of the control member. In one particular embodiment, the first and second pistons of the pilot valve are ported so that when the control member is activated to have the second outlet of the control member in communication with the pilot valve inlet port of the pressure relief valve and as the oil pump speed continues to increase, any oil pump pressure variation with be fed back to the pilot valve where in a first position in which the oil pump pressure is temporarily too high, the first and second pistons are arranged to have the feedback from the pressure relief valve to be expelled to the reservoir and a in a second position, in which the oil pump pressure is temporarily too low, the first and second pistons are arranged to apply oil pump discharge pressure to the pilot valve input of the pressure relief valve to force the pressure relief valve in the closing direction and to raise the oil pump outlet pressure.

DETAILED DESCRIPTION

Figure 1:
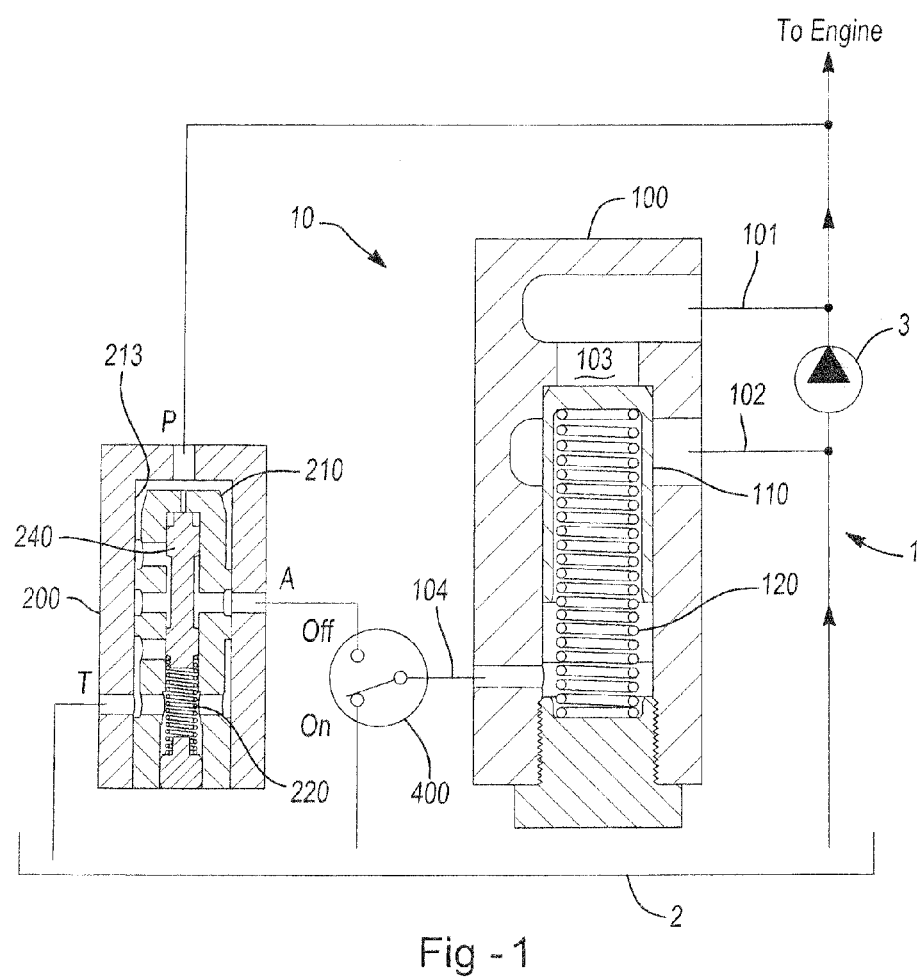
FIG. 1 is a diagrammatic view of an illustrative example of a first embodiment of the oil pump system with a selectable outlet at a first position.

Referring to all of the Figures in general, there is shown a schematic view of a pump system 1 including a pressure control system 10 and a pressure relief valve 100 of the pressure control system for such a pump system 1 is shown in FIG. 1. The pump system 1 includes a sump or reservoir 2 which is schematically shown toward the bottom and a working fluid is to be pumped by the oil pump 3 from the reservoir 2. The pump 3 may be a variable displacement type pump with a control feature which can alter the displacement of pump 3. However, as will be understood by those of skill in the art, the pump 3 may be a fixed displacement pump in which the pressure relief valve as shown is provided and whose operating point or pressure relief valve setting can be set as desired. The oil pump 3 is driven by the engine or other device such as an electric motor (not shown) and when driven by the engine, the speed of the oil pump 3 varies as the engine speed varies. As well understood in the art, as the oil pump 3 speed increases so does the discharge pressure of the oil pump 3.

Referring in particular to FIG. 1, the pump system 1 having a pressure control system 10 is shown. The pressure control system 10 includes a pressure relief valve 100, a pilot valve 200 and a control member or solenoid valve 400 arranged as shown. The control member 400 is preferably a two state valve of any known or appropriate type such as a spool or ball valve that is operated by a solenoid 400 or any other known or appropriate controller that is appropriately capable of receiving a signal for being operated between the two states.

Figure 7:
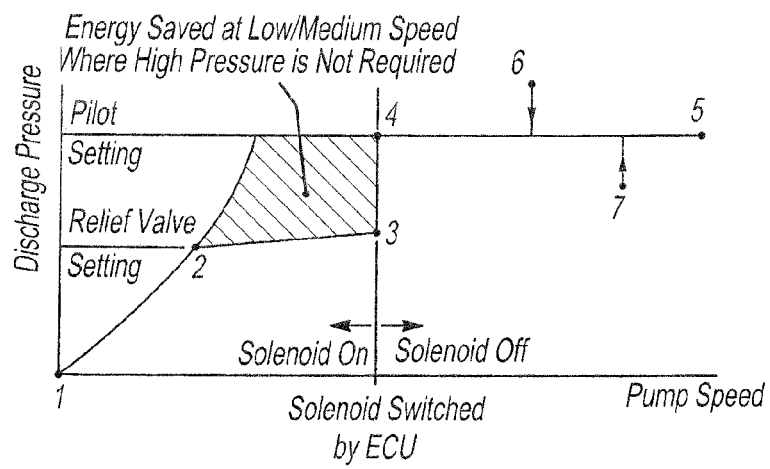
FIG. 7 is a graph of Discharge Pressure versus Oil Pump Speed identifying the energy savings obtained by the oil pump system with a selectable outlet of FIG. 1.

The system in FIG. 1 is shown in a first position in which the engine and the oil pump 3 are not operating as represented by point 1 on the graph of FIG. 7. In this state, the control member or solenoid 400, which is preferably controlled by the engine control module (or ECM, not shown) or another control module that communicated with the ECM, is positioned in a first or ON position as shown. In this first position, the two state valve of the control member 400 is positioned as shown in FIG. 1.

The pressure relief valve 100 has an input 101 that receives the discharge (or output or outlet) oil pressure from the pump 3 and an outlet 102 or "pressure relief output" that commuicates or expels oil from a chamber or bore 103 in the pressure relief valve 100 to the pump 3. The output 104 is to the reservoir 2 which goes back to the pump 3. The pressure relief valve 100 has a single piston member or pressure relief piston 110 that is biased by the pressure relief valve spring 120 in a direction toward the oil pump input 101 to the pressure relief valve 100. The input 101 from output or outlet of the oil pump 3 is applied to a first side of the pressure relief piston 110. The pressure relief valve 100 has a second or pilot input/output 104 on a second or opposite side of the pressure relief valve piston and which works in addition to the pressure relief valve spring 120 to bias the pressure relief valve 100 toward the closed position as shown in FIG. 1.

The pilot valve 200 has a first input or first inlet P therein. The pilot valve 200 includes a first pilot piston or first piston 210 having one side receiving the force of the fluid from the first input P. The first piston 210 is biased toward the first inlet P by the pilot spring 220 located in the pilot bore 213 in the housing of the pilot valve 200. The input to first input P, in FIG. 1 is the discharge pressure from the oil pump 3. The first piston 210 is designed to allow input P to be communicated and/or expelled to a first pilot outlet or output A. Output A communicates with the two state valve of the control member 400 (i.e., the OFF side of the solenoid control member). Thus if the control member 400 is in the ON position, the output A (in the position shown this is the same as first inlet P) is sealed at the control member 400 and is not further communicated to the pressure relief valve 100. As can be readily seen from FIG. 1, when the solenoid control member is in the ON position, the control member 400 does not communicate the output A of the pilot valve 200 to the second or pilot input/output 104 of the pressure relief valve 100. However, in FIG. 1, it should be noted that with there being no discharge pressure, a second pilot piston 240 is also biased toward the first inlet P within the first piston 210 and allows the first inlet P to be communicated to the first piston 210 and through the hole 205 ("205" labeled in FIG. 3) in the top to the top end of the second pilot piston 240 as well as past the first piston 210 through the passage 206 ("206" labeled in FIG. 3) to the chamber 208 ("208" labeled in FIG. 3), around the second pilot piston 240 to the passage 209 ("209" labeled in FIG. 3) in the first piston 210 and to the outlet A. Now, as the engine is started and the engine speed increases so does the oil pump 3 speed and the pump system 1 moves from the first point 1 to the second point 2 on the chart (see FIG. 7) and the system and its components move to the positions shown in FIG. 2.

Figure 2:
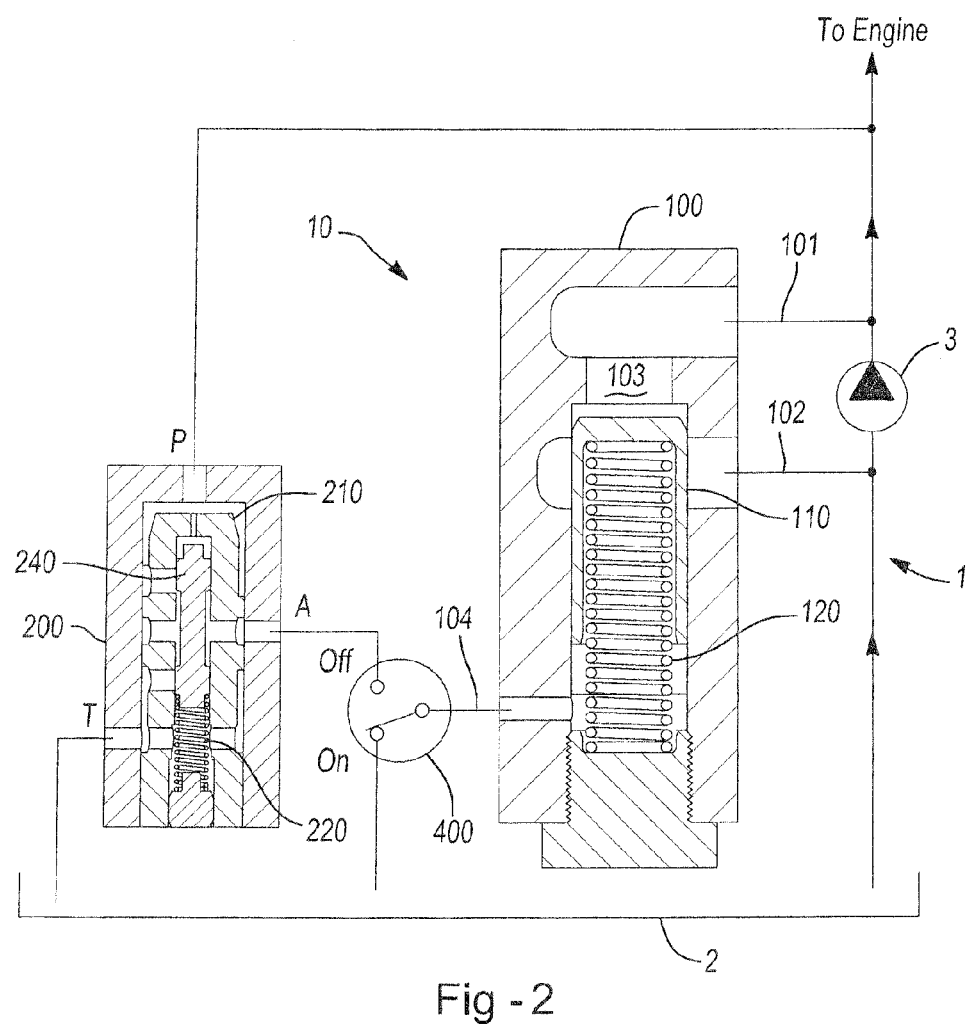
FIG. 2 is a diagrammatic view of the oil pump system with a selectable outlet of FIG. 1 at a second position.

In FIG. 2, the oil pump 3 speed has increased and so too has the discharge pressure applied to the pressure relief valve 100. Accordingly, the pressure relief piston 110 has moved from the closed position 1 (see FIG. 7) of FIG. 1 to a second closed position 2 (see FIG. 7) of FIG. 2 in which the increased pressure at the input 101 to the pressure relief valve 100 has moved the pressure relief piston 110 against the force of the pressure relief valve spring 120. The control member 400 remains in the ON position such that the pilot valve remains 200 disconnected from the pressure relief valve 100. It should also now be noted that with the discharge pressure increase, the inlet pressure at the first inlet P acts against the second pilot piston 240 to move it down within the first pilot piston 210 against the pilot spring 220. As should be noted, the pressure relief valve 100 in FIG. 2 is about to open and as the pump 3 speed increases the components of the system move to the position 3 of the chart (see FIG. 7) as shown in FIG. 3.

Figure 3:
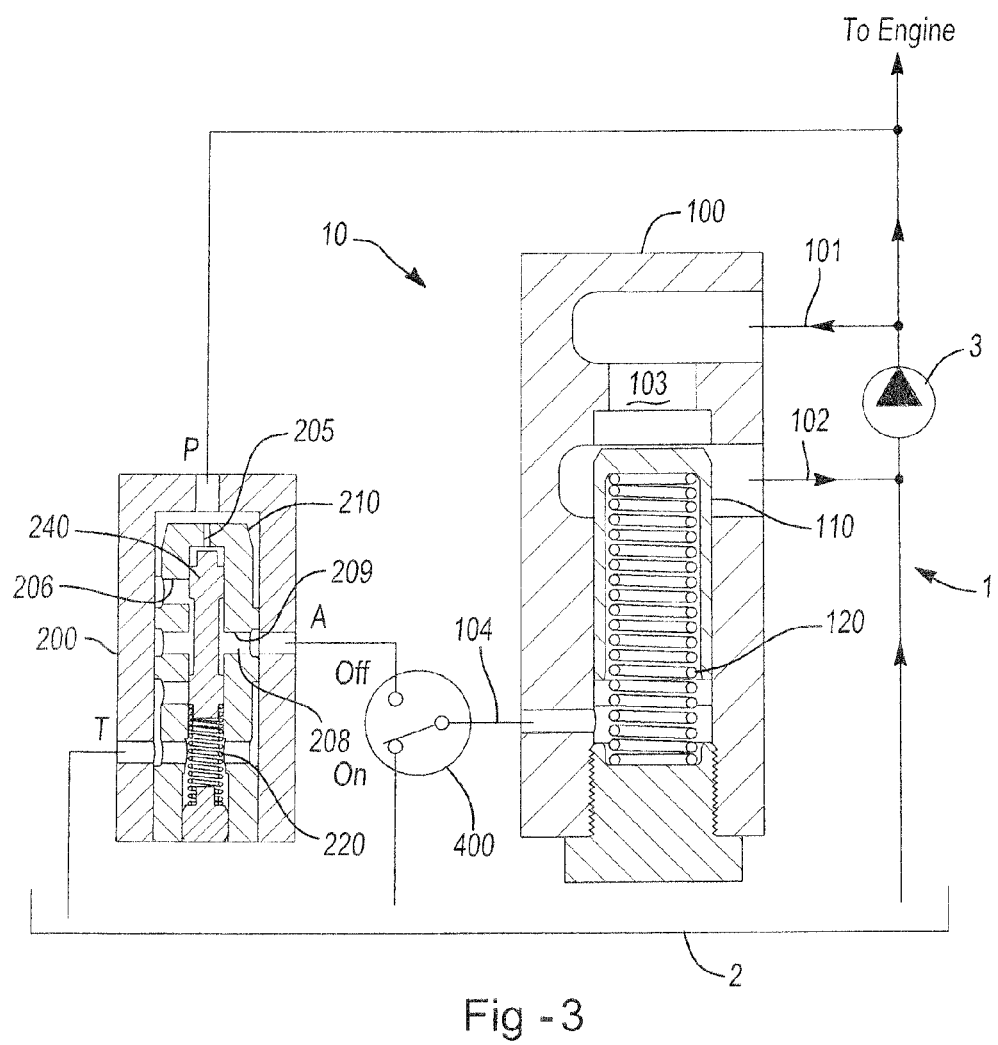
FIG. 3 is a diagrammatic view of the oil pump system with a selectable outlet of FIG. 1 at a third position.
Figure 4:
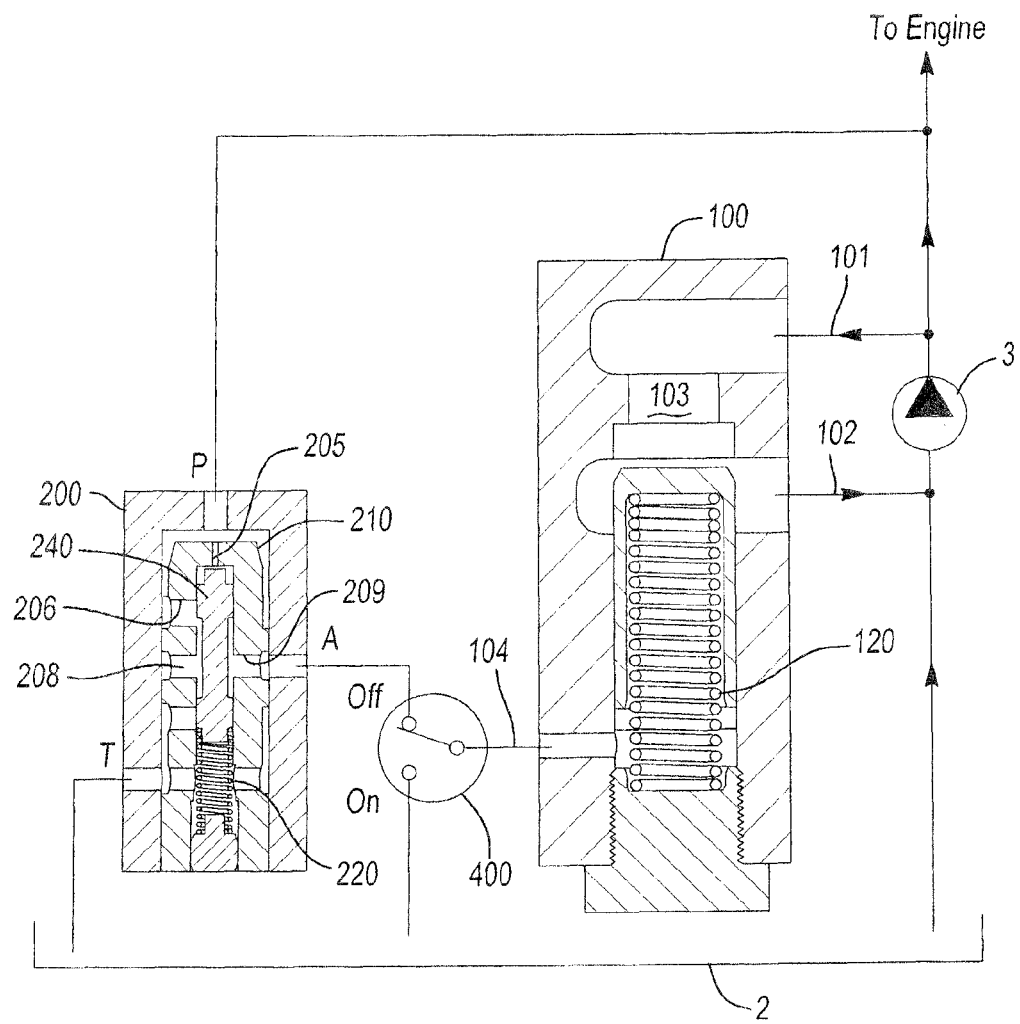
FIG. 4 is a diagrammatic view of the oil pump system with a selectable outlet of FIG. 1 at a fourth position.

In FIG. 3, the oil pump 3 speed has increased and so too has the discharge pressure at input 101 being applied to the pressure relief piston 110 of the pressure relief valve 100. Accordingly, the pressure relief piston 110 has moved from the closed position of FIGS. 1 and 2 to an open position 3 (see FIG. 7) of FIG. 3 in which the increased pressure at the input 101 to the pressure relief valve 100 has moved the pressure relief piston 110 against the force of the pressure relief valve spring 120 to the point where now the input 101 to the pressure relief valve 100 is communicated past the pressure relief piston 110 and fluid is expelled to the pressure relief output and back to the reservoir 2 and oil pump 3 and the control member 400 remains switched to the ON position such that the two way valve remains closed. The pilot valve 200 remains in the same position as in FIG. 2 such that the output A of the pilot valve 200 remains connected to the OFF position of the two way valve of the control member 400. As shown in the chart (see FIG. 7), with the opening of the pressure relief valve 100, the discharge pressure now goes up much more slowly as the pump speed increases with the engine speed until in the next position 4 on the chart, the control member is switched to the OFF position as shown in FIG. 4.

As the speed of oil pump 3 has stayed constant but the discharge pressure has increased significantly, due to the control member 400 being switched to the OFF position and the output A of the pilot valve 200 being applied to the pilot input/output 104 of the pressure relief valve 100. With the increased discharge pressure (point 4 on the chart, See FIG. 7), the pressure relief piston 110 remains in the open position, similar to FIG. 3. and the input to the pressure relief valve at input 101 is communicated past the pressure relief piston 110 so fluid is expelled to the pressure relief output 102 and back to the oil pump 3. With the increased discharge pressure, the second pilot piston 240 of the pilot valve 200 is forced further against the pilot valve spring 220, due to the fluid passing through the passage 205 and forcing against the end of the second pilot piston 240, such that the second pilot piston 240 blocks the passage 206 and cuts off the input P from the chamber 208 thereby preventing it from reaching the output A of the pilot valve 200 such that the output A becomes fixed and the output A of the pilot valve 200 remains connected to the OFF position of the two way valve of the control member 400 and is applied to the pilot input/output 104 of the pressure relief valve 100. As shown in the chart in the figures, with the switching of the control member 400 by the ECM, control module or other controller, the discharge pressure increases and the pump system 1 achieves a self correcting feedback control system. In this position, the pilot valve 200 remains near its center position and the pilot valve acts like a 'potential divider' to hold the output 'A' pressure between the inlet 'P' pressure and the pressure 'T' (i.e., where the hydraulic resistances=electrical resistances) which is communicated to the reservoir 2 at the second pilot output. The pilot outlet 'A' pressure reduces from point 4 on the chart towards point 5 on the chart (see FIG. 7) as the pump 3 speed and flow increases and the pressure relief valve 100 is required to open more to recirculate more (excess) oil fluid flow. In this embodiment, it should be understood that pressure corrections can now be more easily and efficiently made as shown in FIGS. 5-7 and along the chart from points 4 to 5 as indicated at points 6 and 7 (see FIG. 7).

Figure 5:
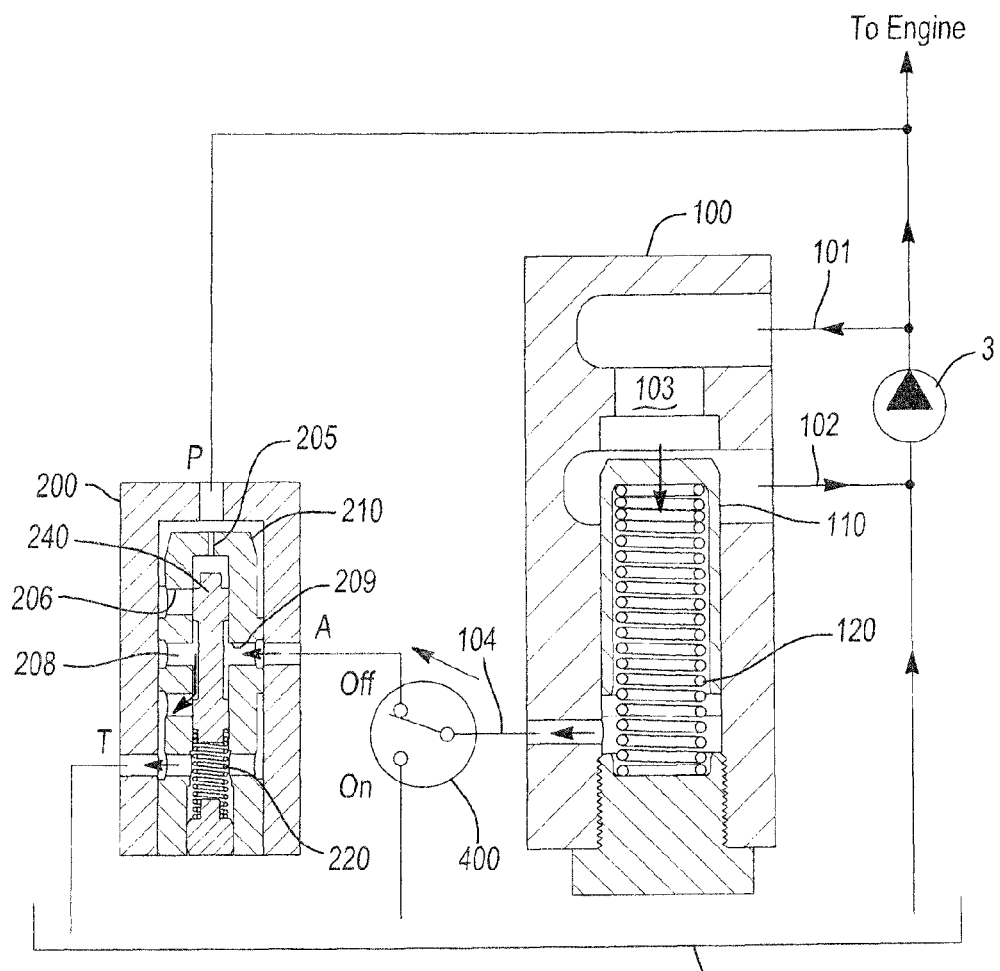
FIG. 5 is a diagrammatic view of the oil pump system with a selectable outlet of FIG. 1 at a sixth position.

In FIG. 5, the oil pump 3 speed has increased but the discharge pressure has stayed substantially constant at the pilot valve 200 setting. The solenoid control member 400 remains switched to the OFF position and the output A of the pilot valve 200 remains applied to the pilot input/output 104 of the pressure relief valve 100. However, as the pump 3 speed increases, the pressure at the first pilot valve outlet A reduces as the pump 3 flow increases and the pressure relief valve 100 is required to open more to recirculate the excess flow. With the reduced outlet pressure A, the discharge pressure at first inlet P of the pilot valve 200 becomes greater than the outlet pressure at outlet A and the second pilot piston 240 is moved further against the pilot valve spring 220 until the outlet pressure A is put in communication with the outlet T as shown by the added arrows in FIG. 5 across the solenoid control member 400 and across the pilot valve 200. Accordingly if there is a pressure increase in the engine, such as shown at point 6 on the chart (see FIG. 7), the discharge pressure signal increases and the second pilot piston 240 in the pilot valve 200 moves to communicate output A to output T and the pump system 1 opens further and the pump system 1 returns to an equilibrium on the line 4-5 (see FIG. 7).

Figure 6:
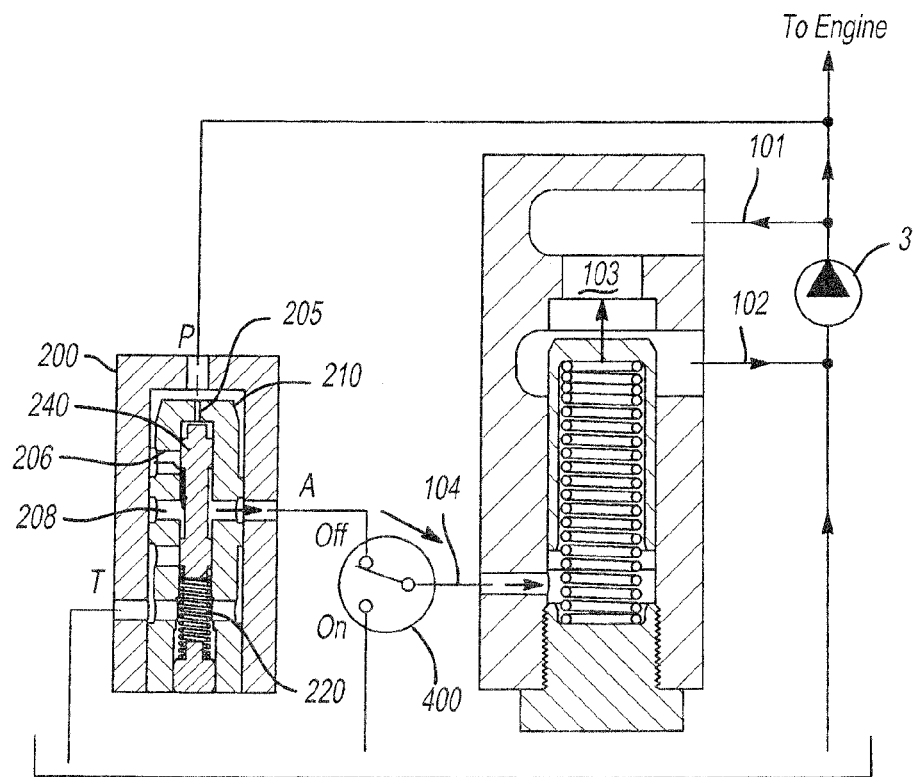
FIG. 6 is a diagrammatic view of the oil pump system with a selectable outlet of FIG. 1 at a seventh position.

In FIG. 6, the pump system 1 is now shown at point 7 on the chart (see FIG. 7) where there is a sudden pressure drop in the engine (or elsewhere) causing a drop in the discharge pressure supplied to first inlet P to the pilot valve 200. In this instance, the second pilot piston 240 of the pilot valve 200 is biased to cause the first inlet P to be put back in communication with the outlet A which is then communicated to the solenoid control member 400. Since the solenoid control member 400 remains in the OFF position and the two way valve is located so the outlet A is communicated to the pilot input/output 104 of the pressure relief valve 100 causing the pressure relief piston 110 of the pressure relief valve 100 to move towards the closed position and reducing the recirculating fluid flow going to the oil pump 3 causing flow to the engine to increase in pressure and moving from point 7 on the chart back to the equilibrium line 4-5 (see FIG. 7).

FIG. 7 shows a representation of the energy potentially saved at low/medium speeds where high pressure is not required to be supplied to the engine. It also shows the equilibrium line 4-5 which provides additional potential efficiency and energy savings along with the other benefits noted herein.

Figure 8:
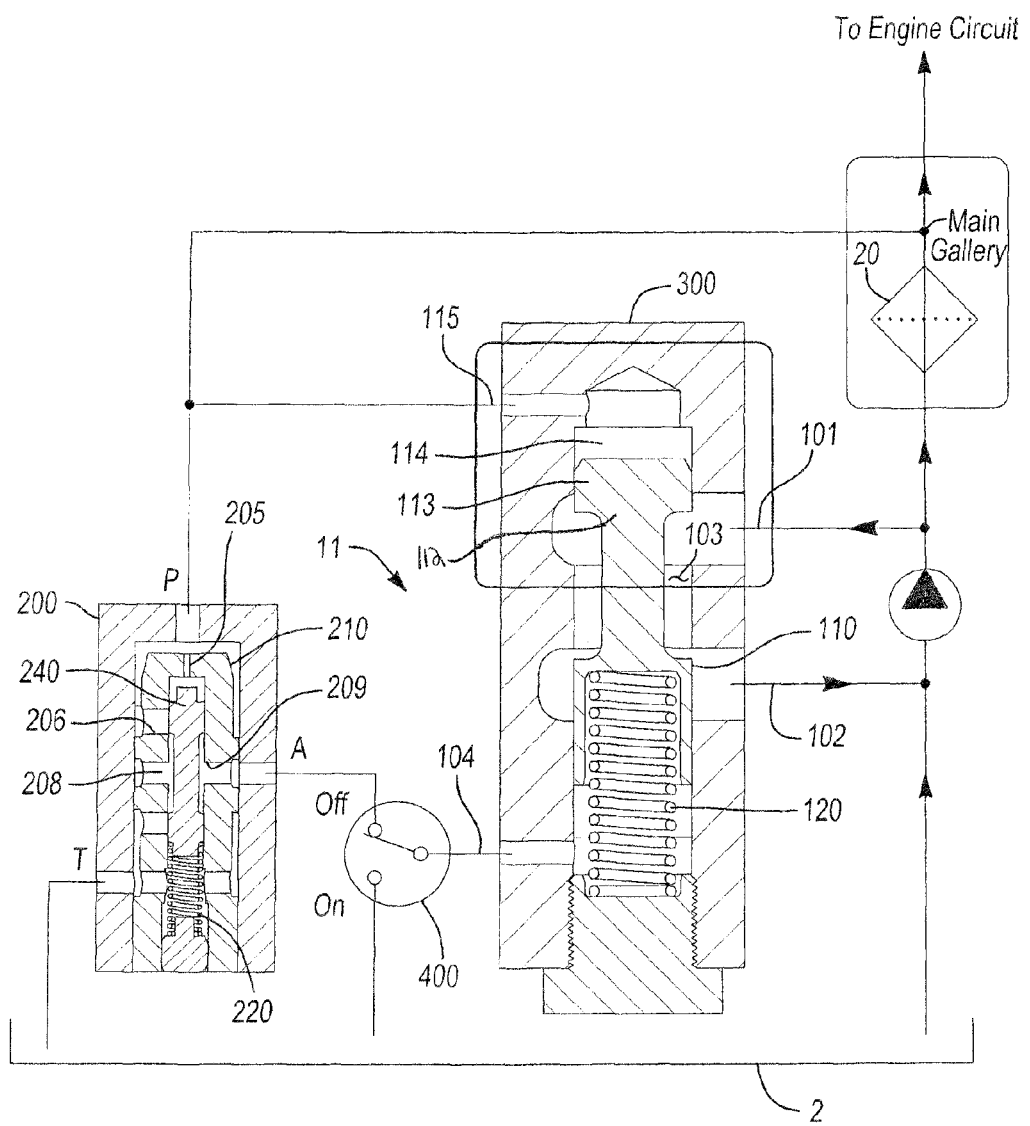
FIG. 8 is a diagrammatic view of an illustrative example of a second embodiment of an oil pump system with a selectable outlet at a first position.
Figure 8A:
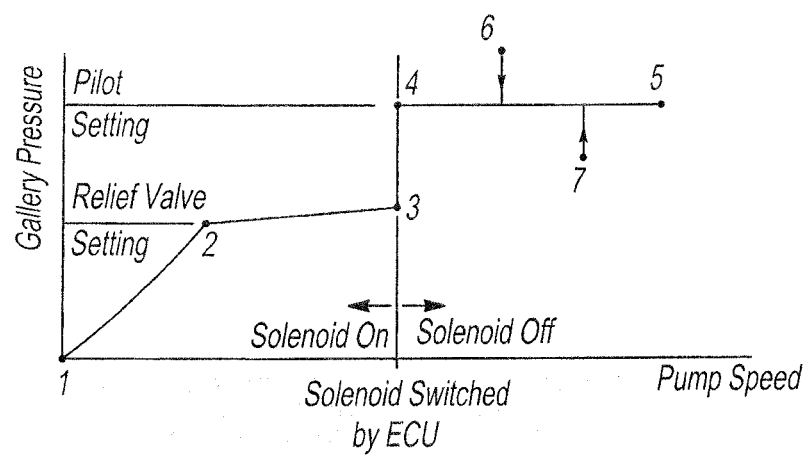
FIG. 8A is a graph of Gallery Pressure versus Oil Pump Speed.

In FIG. 8, a second embodiment of the pressure relief system 11 is shown wherein an oil filter (20) is shown after the oil pump 3 and the pressure relief piston 110 is balanced against the oil pump discharge pressure at input 101 by having an extension member 112 and a second piston 113 located in a second chamber 114. In this embodiment, the main gallery pressure is supplied to the first inlet P of the pilot valve 200 such that the pilot valve 200 now responds to the main gallery pressure instead of directly to the oil pump 3 output pressure as in the earlier embodiment. The main gallery pressure P is also applied to the pressure relief valve 300 at a second inlet 115 which is communicated to the second chamber 114 and the top of the second piston 113 such that the pressure relief valve 300 is responsive to the pressure P (main gallery pressure) supplied through the second inlet 115. As shown in the chart of FIG. 8A, the control of the pressure relief system 11 of FIG. 8 remains similar to the first embodiment but determined by the Gallery Pressure P regardless of the position of the two way valve of the control member 400.

Figure 9:
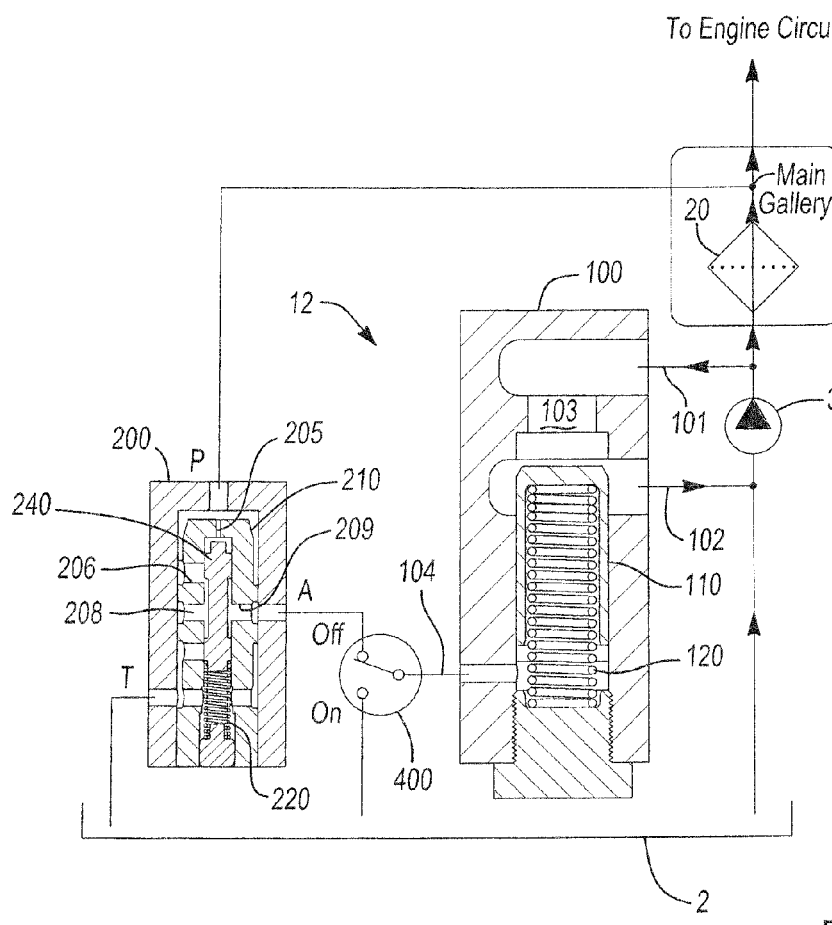
FIG. 9 is a diagrammatic view of an illustrative example of a third embodiment of an oil pump system with a selectable outlet at a first position.
Figure 9:
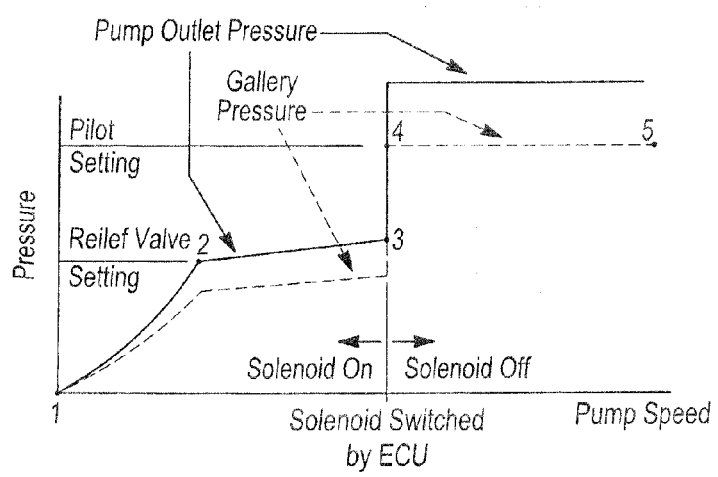

In FIG. 9, a third embodiment of the pressure relief system 12 is shown very similar to the first embodiment of FIG. 1 except wherein an oil filter (20) is added after the oil pump 3 similar to the second embodiment of FIG. 8. In FIG. 9, the pressure relief valve piston input 101 is supplied directly by the pump 3 output pressure and the main gallery pressure is supplied to the first inlet P of the pilot valve 200 such that the pilot valve 200 now responds to the main gallery pressure P instead of directly to the oil pump 3 output pressure to provide a mixed pressure control system 12. As shown in the chart of FIG. 9, the control of the pressure relief system 12 of FIG. 9 remains similar to the first and second embodiments but it can be seen that the pressure-speed curve is altered due to the mixed control.

Figure 10:
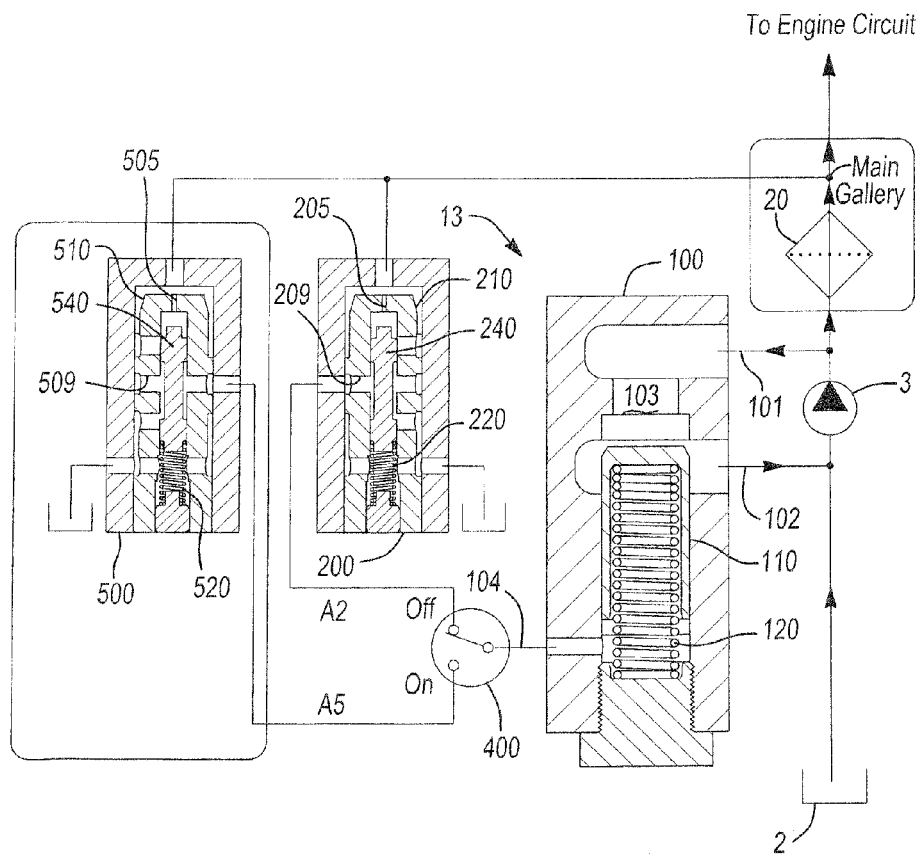
FIG. 10 is a diagrammatic view of an illustrative example of a fourth embodiment of an oil pump system with a selectable outlet at a first position.
Figure 10:
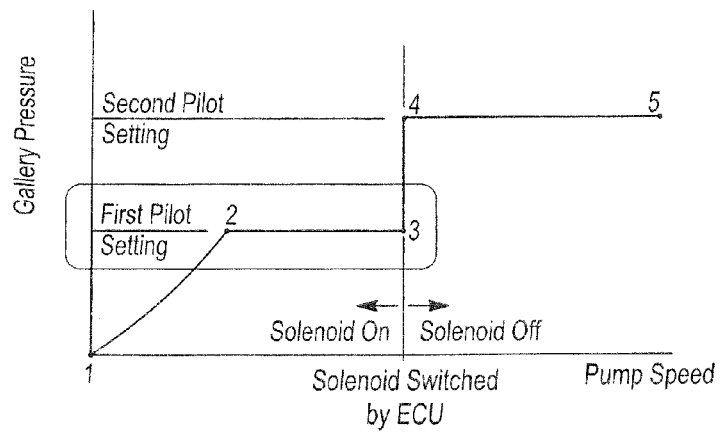

Referring now to FIG. 10, a fourth embodiment of the pressure relief system 13 is shown using a two pilot control system. A second pilot valve 500 is added to the pressure control system 13 shown. The second pilot piston 540 is biasable toward the inlet by the pilot spring 520 within the piston 510 and allows the inlet to be communicated to the piston 510 and through the hole 505 as well as past the piston 510 through the passage 509 and to the outlet. The first pilot valve system 200 operates as a high pressure setting of the control member 400 and has its output A2 supplied to the two way valve of the OFF side of the solenoid control member 400 and the second pilot valve 500 operates as a low pressure setting of the control member 400 and has its output A5 applied to the other of the two way valve of the ON side of the solenoid control member. The embodiment of FIG. 10 also includes an oil filter 20 added after the oil pump 3 and the pressure relief valve piston input 101 is supplied directly by the pump output pressure and the main gallery pressure is supplied to the inlets P of the first and second pilot valves 200 and 500, respectively, such that when the solenoid control member is OFF, the first pilot valve 200 having a high pressure setting A2 is supplied to the pilot inlet/outlet 104 of the pressure relief valve 100 and such that when the solenoid control member is ON, the second pilot valve 500 having a low pressure setting A5 is supplied to the pilot inlet/outlet 104 of the pressure relief valve 100. As shown in the chart in FIG. 10, the control member 400 is operated by the ECM or other controller so that the first or low pilot valve setting A2 controls the line 2-3 which has become flat as compared to the earlier embodiments and the second pilot or high control setting A5 controls along the line 4-5 as the speed of the pump 3 varies.

Figure 11:
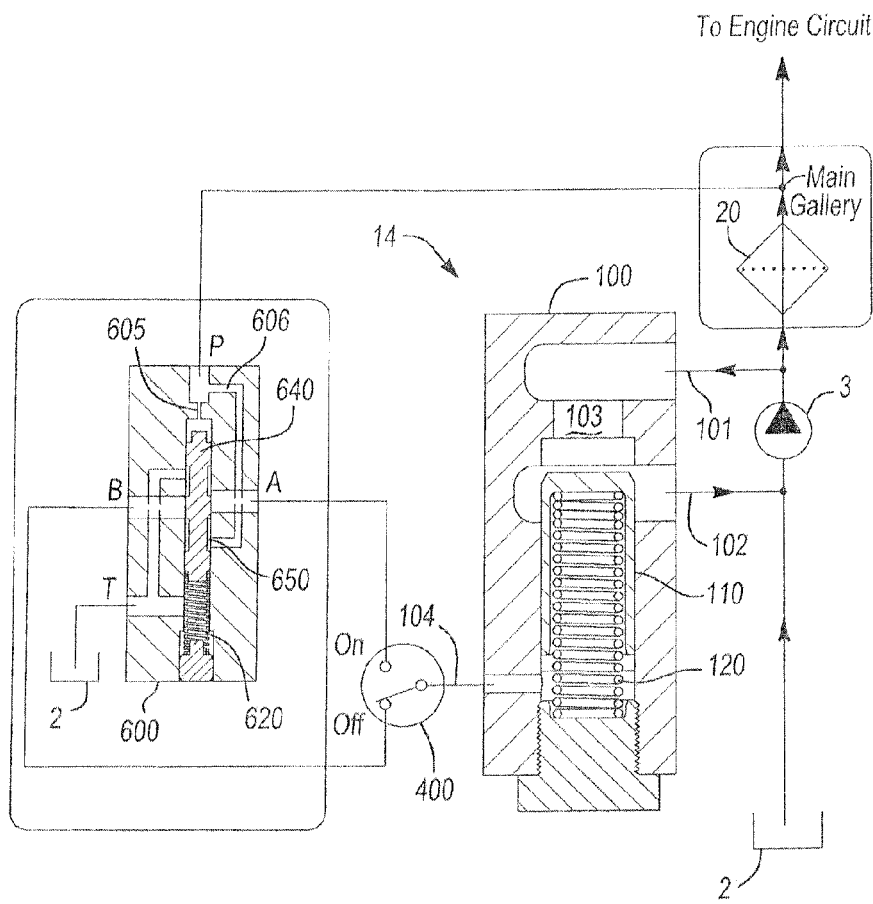
FIG. 11 is a diagrammatic view of an illustrative example of a fifth embodiment of an oil pump system with a selectable outlet at a first position.
Figure 11:
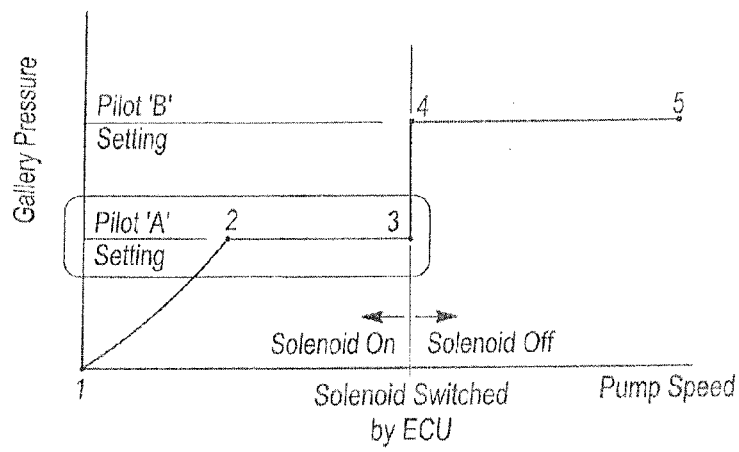

Referring now to FIG. 11, a fifth embodiment of the pressure relief system 14 is shown wherein an oil filter 20 is added after the oil pump 3 and the main gallery pressure feedback signal is applied to the first input P of an alternate design pilot valve 600 and the pressure relief valve piston inlet input 101 is supplied directly by the pump 3 output pressure. Similar to FIG. 10, with its two pilot valves, in FIG. 11 the single pilot valve 600 is configured and ported as a four port pilot control and provides an outlet B which is supplied to the two way valve and the OFF side of the solenoid control member 400 and represents a relatively high pressure pilot 'B' setting for the line 4-5 in the chart of FIG. 11 and the outlet A of the pilot valve 600 is supplied to the two way valve ON side of the solenoid control member 400 and has a relatively low pressure pilot 'A' setting corresponding to the line 2-3 in the chart in FIG. 11. The pilot valve 600 no longer includes a first piston but only includes the corresponding second piston 640 which has a top end including a hole 605 for receiving the gallery feedback signal pressure P and a branch 606 which communicates the same pressure P to a lower chamber 650 defined by the piston 640 and the bore of the housing of the valve 600 receiving the piston 640. A spring 620 biases the piston 640 toward the hole 605 in a manner similar to the prior embodiment. Depending upon the position of the piston 640, one of the gallery feedback signal pressure P and the reservoir pressure T is selectively supplied to the outlet ports A and B.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A pressure relief valve system for use in a fluid lubrication system in an engine, the pressure relief valve system comprising:
   a pressure relief valve including a housing having a bore having a piston and a spring received therein, the pressure relief valve further including an inlet port for admitting a fluid from a high pressure side of the fluid lubrication system into the bore to one side of the piston to move the piston against the force of the spring and an outlet port for expelling the fluid from the bore once the piston has been moved against the increasing spring force to put the inlet port in communication with the outlet port, the pressure relief valve further including a pilot valve pressure inlet port for admitting fluid into the bore to apply fluid pressure on the piston in a direction opposite the fluid pressure from the inlet port;
   a pilot valve including a pilot housing having a pilot bore having a pilot piston and a pilot spring received therein, the pilot valve further including a pilot inlet port for admitting fluid from the high pressure side of the fluid lubrication system into the pilot bore to one side of the pilot piston to move the pilot piston against the force of the pilot spring; a first pilot outlet port for expelling the fluid from the high pressure side of the fluid lubrication system from the pilot valve and a second outlet port for expelling the fluid from the high pressure side of the fluid lubrication system from the pilot valve; and
   a control member having an inlet and first and second outlets wherein the inlet receives fluid from the first pilot outlet port from the pilot valve, the first outlet expels the fluid from the pressure relief valve system and the second outlet supplies the fluid to the pilot valve pressure inlet port in the pressure relief valve and the control member is selectively operated by a signal for switching the second outlet of the control member to communicate with one of the inlet and first outlet of the control member.

2. The pressure relief valve system of claim 1, wherein the control member includes a valve operated by a solenoid.

3. The pressure relief valve system of claim 2, wherein the solenoid is configured to receive a signal from an engine control module.

4. The pressure relief valve system of claim 1, wherein the control member is operated to reduce the power consumption of an oil pump by including a valve operated by a solenoid.

5. The pressure relief valve system of claim 4, wherein the solenoid receives a signal from an engine control module.

6. A pump system for supplying pressurized working fluid to a device for use in a fluid lubrication system in an engine, the pump system comprising:
   a fixed displacement pump;
   a pressure relief valve including a housing having a bore having a piston and a spring received therein, the pressure relief valve further including an inlet port for admitting a fluid from a high pressure side of the fluid lubrication system into the bore to one side of the piston to move the piston against the force of the spring and an outlet port for expelling the fluid from the bore once the piston has been moved against the increasing spring force to put the inlet port in communication with the outlet port, the pressure relief valve further including a pilot valve pressure inlet port for admitting fluid into the bore to apply fluid pressure on the piston in a direction opposite the fluid pressure from the inlet port, the pressure relief valve further including a second inlet port in fluid communication with a main gallery pressure of an oil filter in fluid communication with an outlet of the fixed displacement pump, the second inlet port situated above the inlet port, the pressure relief valve further including a second piston located in a second chamber in fluid communication with the second inlet port, wherein fluid from the main gallery pressure side is admitting at the second inlet port into the second chamber to one side of the second piston in response to the main gallery pressure supplied through the second inlet port;
   a pilot valve including a pilot housing having a pilot bore having a pilot piston and a pilot spring received therein, the pilot valve further including a pilot inlet port for admitting fluid from the main gallery pressure side of the fluid lubrication system into the pilot bore to one side of the pilot piston to move the pilot piston against the force of the pilot spring; a first pilot outlet port for expelling the fluid from the main gallery pressure side of the fluid lubrication system from the pilot valve and a second outlet port for expelling the fluid from the main gallery pressure side of the fluid lubrication system from the pilot valve; and a control member having an inlet and first and second outlets wherein the inlet receives fluid from the first pilot outlet port from the pilot valve, the first outlet expels the fluid from the pressure relief valve system and the second outlet supplies the fluid to the pilot valve pressure inlet port in the pressure relief valve and the control member is selectively operated by a signal for switching the second outlet of the control member to communicate with one of the inlet and first outlet of the control member.

* * * * *